US009488716B2

(12) United States Patent
Gaubitch et al.

(10) Patent No.: US 9,488,716 B2
(45) Date of Patent: Nov. 8, 2016

(54) MICROPHONE AUTOLOCALIZATION USING MOVING ACOUSTIC SOURCE

(71) Applicant: GOOGLE INC., Mountain View, CA (US)

(72) Inventors: Nikolay D. Gaubitch, Delft (NL); Willem Bastiaan Kleijn, Lower Hutt (NZ); Richard Heusdens, Delft (NL)

(73) Assignee: GOOGLE INC., Mountain View, CA (US)

( * ) Notice: Subject to any disclaimer, the term of this patent is extended or adjusted under 35 U.S.C. 154(b) by 377 days.

(21) Appl. No.: 14/145,196

(22) Filed: Dec. 31, 2013

(65) Prior Publication Data

US 2015/0185312 A1 Jul. 2, 2015

(51) Int. Cl.
*G01S 5/26* (2006.01)
*G01S 5/18* (2006.01)
*G01S 5/30* (2006.01)

(52) U.S. Cl.
CPC ... *G01S 5/18* (2013.01); *G01S 5/30* (2013.01)

(58) Field of Classification Search
CPC .... G01S 5/26; G01S 7/52004; G01S 15/931; G01S 7/5205; G01S 5/021; G01S 7/5208; G01S 13/87; G01S 13/931; G01S 15/00; G01S 15/02; G01S 15/04; G01S 15/66; G01S 15/878; G01S 15/88; G01S 15/8913; G01S 17/87; G01S 2007/403; G01S 2007/4082; G01S 2007/4091; G01V 13/00; G01V 1/16; G01V 1/38; G01V 1/3808; G01V 1/3817; G01V 2200/14; G01V 1/18; G01V 1/36; G01V 1/003; G01V 1/02; G01V 1/24; G01V 1/40; G01V 2200/12; G01V 2210/56; G01V 11/002; G01V 2003/086; G01V 2210/1423; G01V 2210/32; G01V 2210/57; G01V 2210/614; G01V 2210/65; G01V 2210/67; G01V 2210/675; G01V 2210/679; G01V 3/083
USPC ............................................. 367/13
See application file for complete search history.

(56) References Cited

U.S. PATENT DOCUMENTS 4,909,064 A * 3/1990 Talmadge ............. G01L 27/005
73/1.82
5,247,489 A * 9/1993 Pirie ....................... G01S 11/14
367/127

(Continued)

OTHER PUBLICATIONS

Patterson; Microphone Position and Gain Calibration for a Large-Aperture Microphone Array; IEEE Transactions on Speech and Audio Processing, vol. 13, No. 1, Jan. 2005.*

(Continued)

*Primary Examiner* — Isam Alsomiri
*Assistant Examiner* — Amienatta M Ndure Jobe
(74) *Attorney, Agent, or Firm* — Birch, Stewart, Kolasch & Birch, LLP

(57) ABSTRACT

Provided are methods and systems for calibrating a distributed sensor (e.g., microphone) array using time-of-flight (TOF) measurements for a plurality of spatially distributed acoustic events at the sensors. The calibration includes localization and gain equalization of the sensors. Accurate measurements of TOFs are obtained from spatially distributed acoustic events using a controlled signal emitted at known intervals by a moving acoustic source. A portable user device capable of playing out audio is used to produce a plurality of acoustic events (e.g., sound clicks) at known intervals of time and at different, but arbitrary locations based on the device being moved around in space by a user while producing the acoustic events. As such, the times of the acoustic event generation are known, and are spatially diverse. The calibration signals emitted by the acoustic source are designed to provide robustness to noise and reverberation.

20 Claims, 10 Drawing Sheets

(56) References Cited

U.S. PATENT DOCUMENTS

| | | | | |
|---|---|---|---|---|
| 2004/0233785 | A1* | 11/2004 | Szajnowski | G01R 29/02 367/124 |
| 2010/0327848 | A1* | 12/2010 | Stein | A61B 5/4528 324/76.12 |
| 2013/0163382 | A1* | 6/2013 | Millar | G01S 13/46 367/127 |

OTHER PUBLICATIONS

Omologo; Speaker Localization and Tracking—Evaluation Criteria; Jan. 18, 2005.*

M. Crocco et al., "A Closed Form Solution to the Microphone Position Self-Calibration Problem", IEEE Intl. Conf. on Acoust., Speech, Signal Process (ICASSP), May 2012. pp. 2597-2600.

M. Crocco, A. Del Bue and V. Murino, "A blinear approach to the position self calibration of multiple sensors," IEEE Trans. Signal Process., vol. 60, No. 2, pp. 660-673, Feb. 2012.

N.D. Gaubitch, W.B. Kleijn and R. Heusdens, "Auto-localization in ad-hoc microphone arrays," In Proc. IEEE Intl. Conf. on Acoust., Speech, Signal Process. (ICASSP), Vancouver, Canada, May 2013, pp. 106-110.

S. Thrun, "Affine structure from sound", In Advances in Neural Information Processing Systems 18, Y. Weiss, B. Scholkopf and J. Platt, Eds., pp. 1353-1360. MIT Press, Cambridge, MA, 2006.

Patterson, W. R. et al., "Microphone Position and Gain Calibration for Large-Aperture Microphone Array", IEEE Transactions on Speech and Audio Processing, vol. 13, No. 1, Jan. 1, 2005, pp. 42-52.

* cited by examiner

MICROPHONE AUTOLOCALIZATION USING MOVING ACOUSTIC SOURCE

BACKGROUND

In order for microphones (e.g., installed on portable user devices, such as cellular phones) to be capable of determining their own locations (e.g., relative to one another and to one or more sources of sound) it is necessary to have a set of acoustic events. In an existing approach to self-localization of microphones, acoustic events are created independently of the devices, for example, by a user clapping hands. Such an approach introduces four unknowns per acoustic event (the three spatial coordinates and the time of the event). As the problem of computing the unknowns is highly non-linear, it is difficult to deal with all of these additional unknowns. In particular, the unknown event timing of the acoustic events prolongs the convergence of existing self-localization algorithms.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to calibrating distributed sensors using time-of-arrival measurements from spatially distributed acoustic events.

One embodiment of the present disclosure relates to a computer-implemented method comprising measuring arrival times of a set of acoustic events at a set of sensors, wherein the acoustic events are generated at time intervals known to the sensors, and estimating internal delays of the sensors based on registered arrival times of the acoustic events at the sensors.

In another embodiment, the method further comprises calculating times of flight for the acoustic events to reach the sensors based on the registered arrival times of the acoustic events at the sensors and event generation times for the acoustic events, and determining locations of the sensors using the times of flight for the acoustic events to reach the sensors.

In another embodiment, the method further comprises selecting the first acoustic event generated as a reference time for calculating the times of flight for the acoustic events to reach the sensors.

In yet another embodiment, the method further comprises determining a relative gain for each of the sensors using the calculated location of the sensor and the registered arrival times of the events at the sensor.

Another embodiment of the present disclosure relates to a method comprising: calculating times of flight for a set of acoustic events to reach a set of sensors based on registered arrival times of the acoustic events at the sensors and event generation times for the acoustic events, wherein the acoustic events are generated at time intervals known to the sensors; calculating locations of the sensors using the times of flight for the acoustic events to reach the sensors; and determining a relative gain for each of the sensors using the calculated location of the sensor and the registered arrival times of the events at the sensor.

In another embodiment, the method further comprises measuring arrival times of the set of acoustic events at the set of sensors, and estimating internal delays of the sensors based on the registered arrival times of the acoustic events at the sensors.

In another embodiment, the method further comprises selecting the first acoustic event generated as a reference time for calculating the times of flight for the acoustic events to reach the sensors In one or more other embodiments, the methods and systems described herein may optionally include one or more of the following additional features: calculating the times of flight for the acoustic events to reach the sensors is performed iteratively to refine the times of flight; each of the acoustic events is a calibration signal that is a Gaussian modulated sinusoidal pulse; each of the acoustic events is a calibration signal that is a time-stretched pulse; each of the acoustic events is a calibration signal that is a unit impulse; the set of sensors is a set of microphones; the set of events is generated by a device with a loudspeaker from a plurality of different locations relative to the sensors; one or more of the sensors are microphones located on mobile telephones; and/or the relative gain for each of the sensors is determined based on an estimation of the signal-to-noise (SNR) at the sensor.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
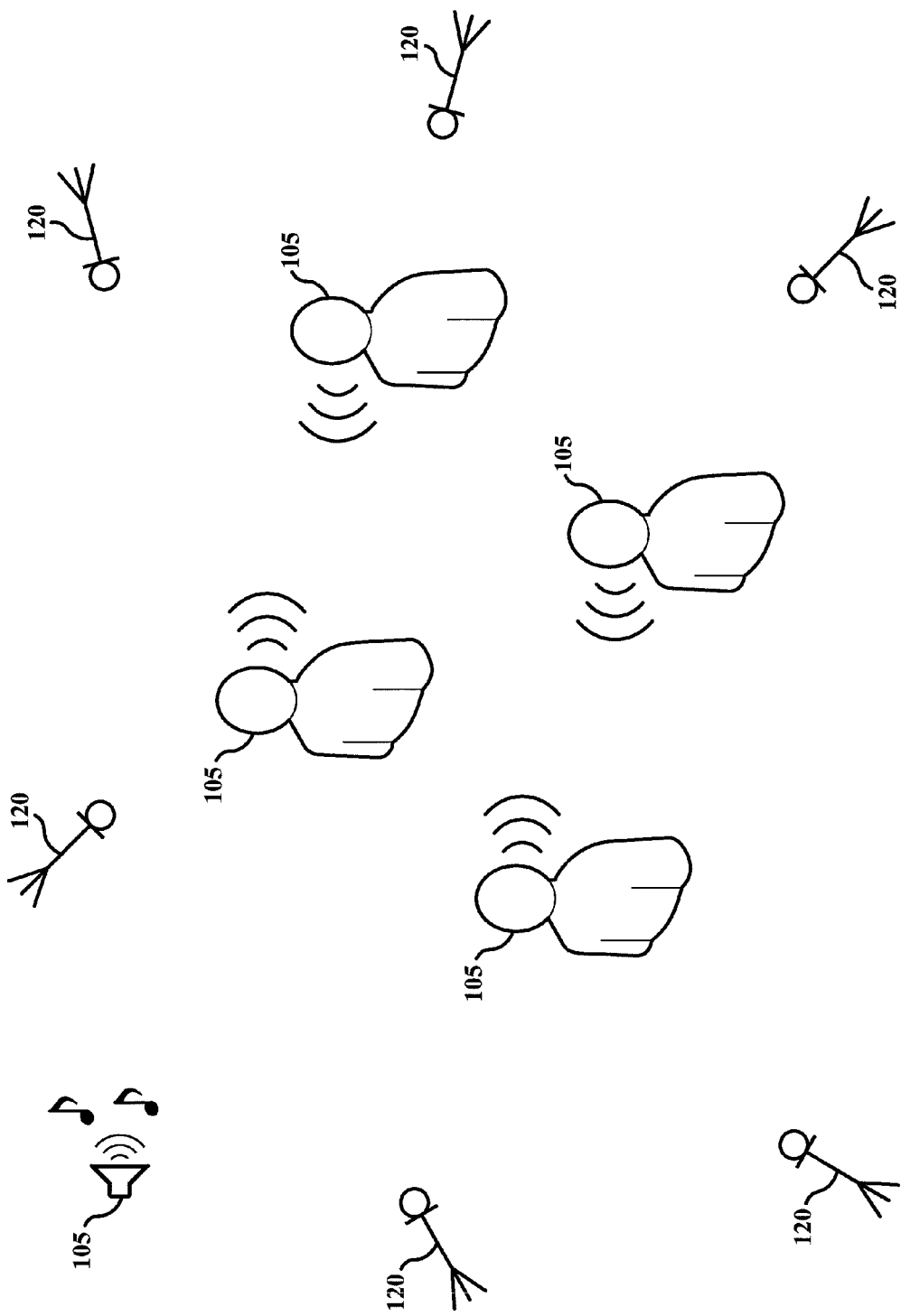
FIG. 1 is a schematic diagram illustrating an example application for autolocalization of sensors in a signaling environment according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for calibrating a distributed sensor array using time-of-flight (TOF) measurements of a plurality of spatially distributed acoustic events at the sensors (e.g., audio input devices, such as microphones). In accordance with one or more embodiments, the calibration may include localization and gain equalization of the sensors. The localization and gain equalization information generated for the sensors may be used, for example, for near-field beam-forming, which allows for selecting between different talkers and reducing environmental acoustic noise. Example applications of the methods and systems described herein include ad-hoc conference calling, group video chat, and the like.

The accurate estimation of TOF is an important element for successful calibration of distributed sensor arrays. As such, the present disclosure provides a method for practical and accurate measurements of TOF from spatially distributed acoustic events using a controlled signal emitted at known intervals by a moving acoustic source. As will be described in greater detail herein, the signals may be designed to provide robustness to noise and reverberation. Furthermore, the present disclosure will demonstrate that the measured TOFs may be used for accurate sensor localization to an accuracy of 1-3 cm, and will also describe a new method for gain calibration based on the measured TOFs. Examples utilizing the methods described herein will illustrate that accurate sensor localization and gain calibration may be achieved even in the presence of noise and reverberation.

One or more embodiments described herein may utilize a moving acoustic source emitting a calibration signal at known intervals. For example, a portable user device (e.g., a mobile telephone, smartphone, etc.) capable of playing out audio may be used to produce a plurality of acoustic events (e.g., sound clicks) at known intervals of time (e.g., every 0.5 seconds, every 1 second, etc.) and at different, but arbitrary locations based on the device being moved in spaced (e.g., by a user or operator of the device) while producing the acoustic events. As such, the times of the acoustic event generation are known, and are spatially diverse. As will be described in greater detail below, the TOFs of these emitted calibration signals at a set of microphones and the observed signals at these microphones may be used to estimate the gain differences between microphones in addition to performing microphone localization.

FIG. 1 illustrates an example application for auto-localization of sensors in a signaling environment according to one or more embodiments described herein. A plurality of signal sources 105 (e.g., talkers, loudspeakers, etc.) may be located amongst a plurality of sensors 120 (e.g., microphones or other audio input devices).

Microphone arrays facilitate a wide range of algorithms for speech and audio processing. For many of these algorithms to operate correctly, there are two requirements on the microphone array: (i) the relative locations of the microphones must be known and (ii) the microphones must be calibrated to have the same gain and to reduce deviations from an ideal (e.g., flat) transfer function. This can be achieved by careful selection of the microphones and a priori defined microphone configuration so that the relative distances are known. However, there are several disadvantages with such an approach: fixed arrays do require dedicated hardware, microphone characteristics change over time and, depending on the structure of the array, the locations of the microphones may also change. Consequently, an automatic configuration scheme would be useful. Such an automatic procedure would also facilitate the use of more flexible ad-hoc microphone arrays where devices containing microphones such as mobile phones, tablets and laptops, are deployed.

The present disclosure provides a method that uses a moving controlled acoustic (e.g., sound) source to solve both the microphone localization and calibration problems. As will be described in greater detail below, the method forms a complete microphone array configuration system.

Microphone arrays can be used to capture speech and audio signals in adverse acoustic environments. The microphone signals may be processed and combined in order to focus on a signal originating from a particular location with respect to the microphones while suppressing signals from all other locations. Such a technique results in reduced noise and reverberation compared to an unprocessed, single-microphone observation.

A common approach to microphone array processing is beam-forming. While there are several existing beam-forming techniques, there are often two common requirements for these techniques to operate correctly: (i) the relative locations of the microphones must be known and (ii) the microphones must be calibrated. One straightforward solution is to manually measure the inter-microphone distances and to carefully select and calibrate the microphones. However, such an approach may not be feasible where, for example, ad-hoc microphone arrays are involved. In such a scenario, an automatic procedure may be preferred.

While some existing methods for localization of microphones and acoustic sources rely on measurements of the TOF, or, equivalently, time-of-arrival at the sensor (TOA), from spatially-distributed acoustic events, other alternative approaches have also been explored including, for example, time-difference-of-arrival (TDOA), signal energy, and the diffuse noise field coherence. It has also been shown that gain calibration is important for several beamforming algorithms and some algorithms for automatic gain calibration have been proposed.

Despite the existence of TOF-based localization methods, there has been relatively little discussion on how to obtain accurate TOF measurements in practice, and errors in such measurements are typically modeled as additive measurement noise. However, as will be described in greater detail below, the methods and systems of the present disclosure are designed to obtain accurate TOF measurements by accounting for, among other things, the following considerations. First, the registered time-of-arrival (RTOA) for a specific acoustic event (e.g., generated from an acoustic source, such as a loudspeaker of a portable user device) needs to be identified correctly for all microphones. In accordance with the embodiments described herein, the RTOA may be considered the sum of the time that the signal arrives at the sensor and the device-internal delay due to, for example, buffering and/or processing. Second, the onset time of the acoustic event (e.g., the time at which the acoustic source begins transmitting the sound) needs to be identified. Third, the internal delay of each microphone (e.g., the time from which the sound reaches the microphone to the time that the sound is registered as received by the user device in which the microphone is installed) needs to be identified. As will be described in greater detail below, for a given microphone, subtracting the internal delay of the microphone and the onset time of the acoustic event from the RTOA identified for the microphone gives the TOF for the microphone. It should be noted that if an internal delay associated with the acoustic source is constant, such delay may not factor in to the computations described above.

One existing approach to microphone localization proposes to use chirps or maximum length sequences (MLSs) to identify the acoustic events. Under such an approach, the onset times are estimated under the assumption that each microphone is associated with an acoustic event occurring in its proximity while the internal delays are measured manually.

Figure 2:
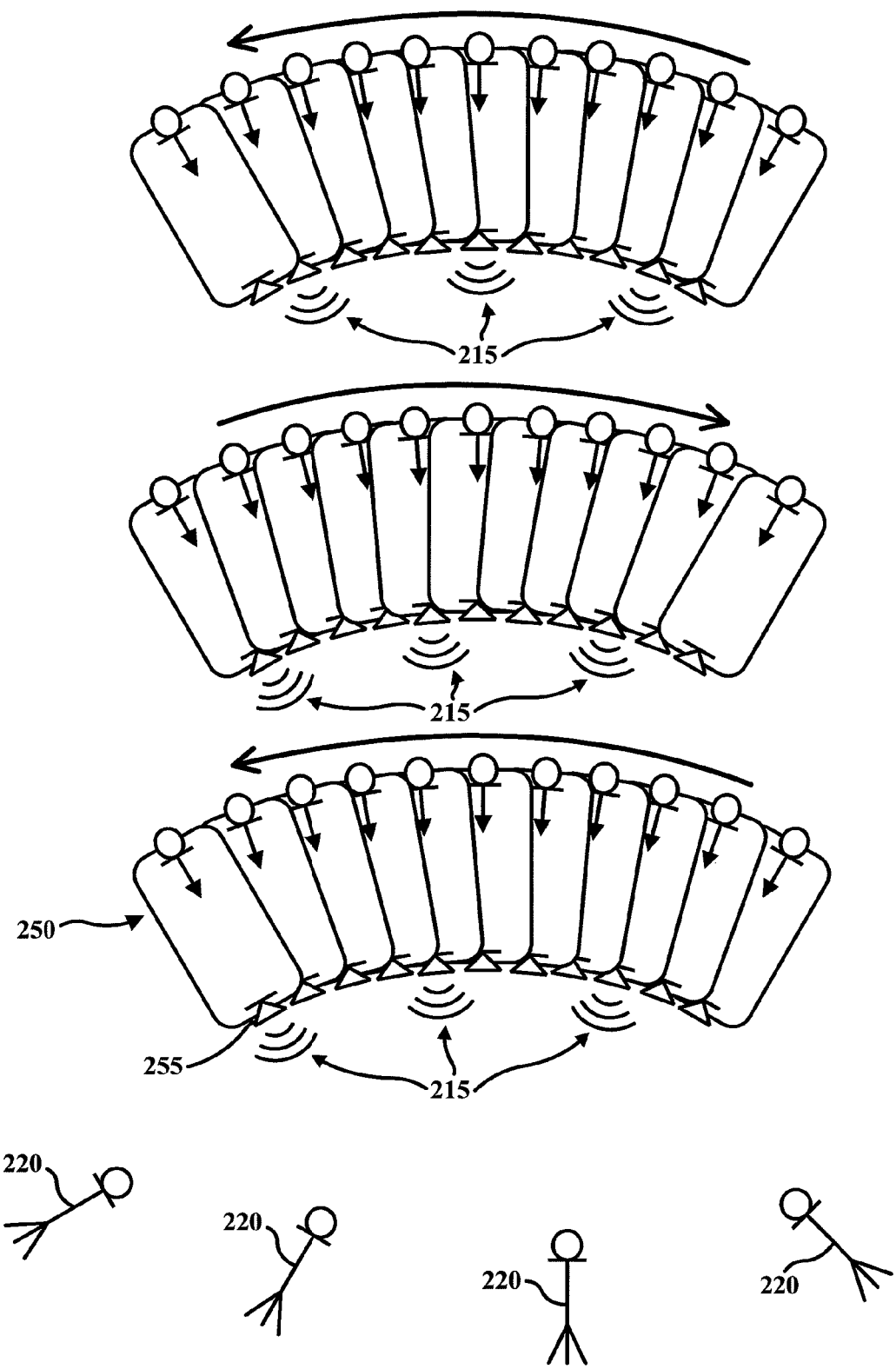
FIG. 2 is a schematic diagram illustrating an example moving acoustic source emitting a calibration signal at known intervals according to one or more embodiments described herein.

The following disclosure illustrates that a complete calibration of a distributed sound acquisition system may be achieved provided that accurate TOF measurements are available. In accordance with at least one embodiment, a portable user device (e.g., mobile telephone, smartphone, etc.) may be used to emit a calibration signal from which the TOF measurements are obtained. The calibration signal may be emitted at known time intervals, which may determine the source onset times. FIG. 2 illustrates an example of such a moving acoustic source 250 emitting a calibration signal 215 at known intervals according to one or more embodiments described herein. The acoustic source 250 may include an output device (e.g., loudspeaker) 255 configured to generate and output the calibrating signals 215 while being moved to different locations relative to a plurality of sensors 220 (e.g., microphones or other audio input devices). It should be understood that the acoustic source 250 utilized to generate the calibration signals 215 may be moved in any of a variety of manners and/or directions relative to the sensors 220 in addition to or instead of the example manner illustrated in FIG. 2.

As will be described in greater detail below, an algorithm is derived to estimate the internal delays of the microphones. It will also be shown that such a controlled source facilitates the design of a calibration signal that is robust to noise and reverberation. The measured TOFs may be utilized to localize the microphones, and may further be utilized in conjunction with the observed calibration signals to estimate the relative gain differences between the microphones. Thus, the approach described herein provides complete calibration for a distributed microphone array.

Figure 3:
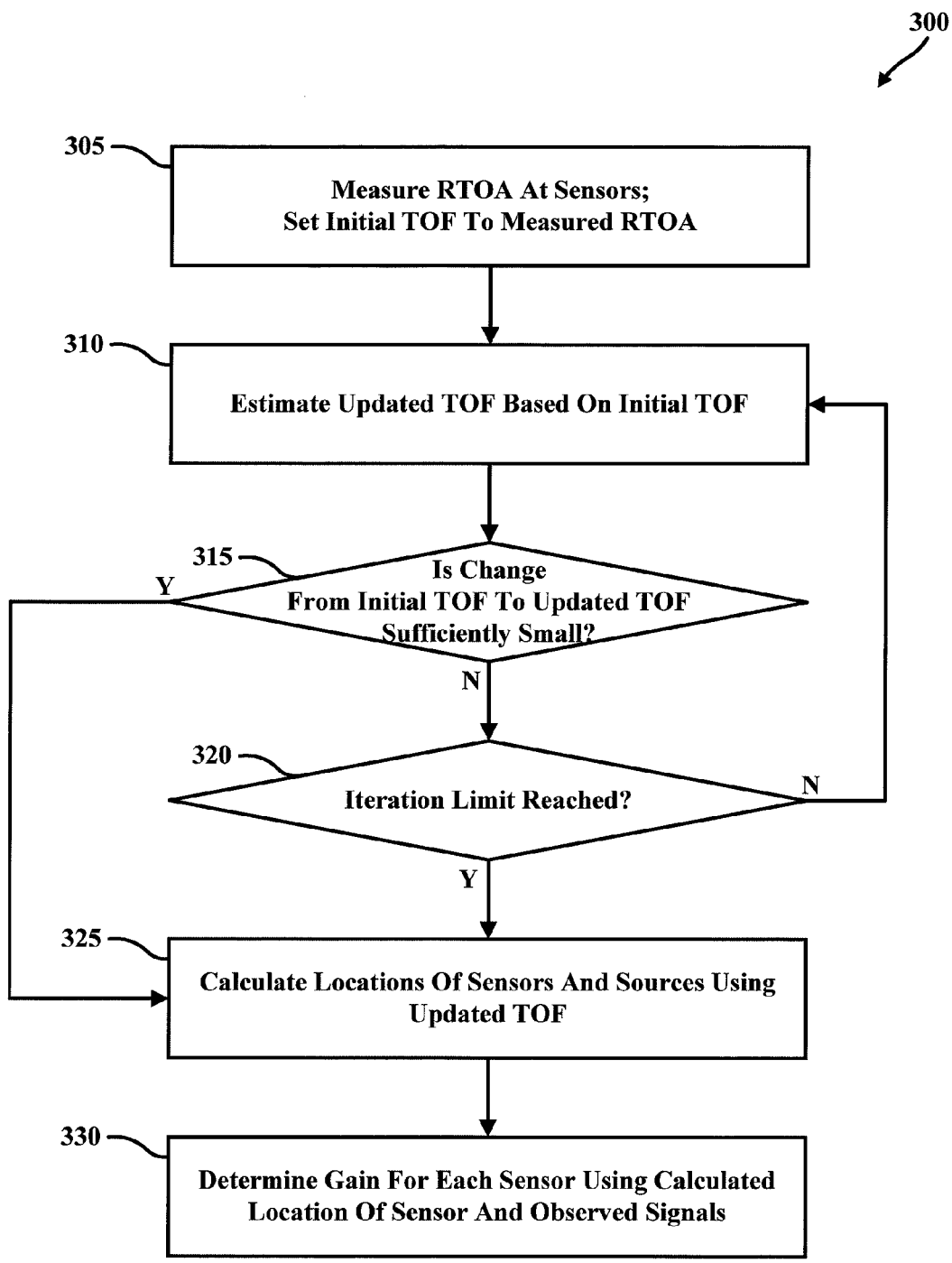
FIG. 3 is a flowchart illustrating an example method for calibrating a distributed sensor array using time-of-flight measurements according to one or more embodiments described herein.

FIG. 3 illustrates an example process for calibrating a distributed sensor array using time-of-flight measurements according to one or more embodiments described herein. At block 305, RTOAs of a particular acoustic event (e.g., generated from an acoustic source, such as a loudspeaker of a portable user device) at a plurality of sensors may be measured, and the measured RTOAs used as initial TOF measurements for the acoustic events to reach the sensors. At block 310, updated TOF measurements for the acoustic events to reach the sensors may be obtained using the initial TOF measurements determined at block 305.

At block 315, it may be determined, for each of the sensors, whether the change from the initial TOF measurement from block 305 to the updated TOF measurement calculated at block 310 is sufficiently small (e.g., whether the change from the initial TOF measurement to the updated TOF measurement is small enough that the updated TOF measurement can be considered accurate for source localization purposes). If it is determined at block 315 that the change from the initial TOF measurement (e.g., from block 305) to the updated TOF measurement (e.g., from block 310) for each of the sensors is sufficiently small, then at block 325 the updated TOF measurements for the sensors may be used to calculate the locations of the sensors and of the sources. On the other hand, if it is determined at block 315 that the change from the initial TOF measurement (e.g., from block 305) to the updated TOF measurement (e.g., from block 310) for each of the sensors is not sufficiently small, then at block 320 a determination may be made as to whether a predetermined limit on the number of iterations to be performed has been reached.

If it is determined at block 320 that the iteration limit has been reached, then the process may return to block 310 where further updated (e.g., refined) TOF measurements for the acoustic events to reach the sensors may be obtained using the initial TOF measurements determined at block 305. However, if it is instead determined at block 320 that the iteration limit has been reached, then the process may move to block 325 where the updated TOF measurements for the sensors may be used to calculate the locations of the sensors and of the sources, as described above.

At block 330, relative gain differences between the sensors may be determined using the calculated locations of the sensors from block 325 and the observed calibration signals at the sensors.

Each of the blocks comprising the example process 300 will be described in greater detail in the sections that follow below.

Problem Formulation

Consider, for example, a 3-dimensional space where J calibration signals $s_j(n)$ (e.g., acoustic events) originating from different and unknown locations $s_j=[s_{x,j}\ s_{y,j}\ s_{z,j}]^T$ are captured by I microphones at unknown locations $r_i=[r_{x,i} r_{y,i} r_{z,i}]^T$. The signal from source j to microphone i can be written $$x_{ij}(n)=G_i(h_{ij}(n)*s_j(n)+v_{ij}(n)), \quad (1)$$

where $h_{ij}(n)$ is the acoustic impulse response (AIR) and $v_{ij}(n)$ is additive measurement noise and * denotes convolution. Each microphone has an associated unknown gain, $G_i$.

In accordance with at least one embodiment described herein, a method is provided for accurately extracting the TOF for each calibration signal and each microphone from the observed signals $x_{ij}(n)$, using the TOFs to calculate the relative locations of the microphones $r_i$, and using the TOFs and observed signals $x_{ij}(n)$ to estimate the microphone gains $G_i$.

RTOA Measurements

The availability of accurate STOA measurements is important to many microphone localization algorithms. STOA measurements may be obtained from the observed signals $x_{ij}(n)$ full stop. The measured RTOA of acoustic event $s_j$ at microphone $r_i$ may be determined as $$t_{ij}=c^{-1}\|r_i-s_j\|+\tau_j+\delta_i+\epsilon_{ij} \quad (2)$$

where c is the speed of sound, $\|\cdot\|$ denotes Euclidean norm, $\epsilon_{ij}$ is measurement noise, $\delta_i$ is the ith microphone internal delay, and $\tau_j$ denotes the onset time of the jth acoustic event. Furthermore, $c^{-1}\|r_i-s_j\|+\tau_j$ is the STOA. As used herein, the "internal delay" refers to the time from which a sound (e.g., acoustic event) reaches an audio capture device (e.g., microphone) to the time the sound is registered as received by the capture device. Accurate localization depends on the TOF $c^{-1}\|r_i-s_j\|$, and therefore the source onset times and internal delays should be compensated for, and the measurement error should be kept to a minimum. As will be further described in the following, one or more embodiments of the present disclosure present a robust approach to localization that achieves these aims by using a controlled signal from a moving source.

Excitation Signals

In accordance with at least one embodiment described herein, acoustic events may be generated by a portable user device capable of audio playback (e.g., a mobile telephone, smartphone, etc.), which may be considered an "audio source device." It may be assumed that microphones installed in other user devices involved in an audio communication session (e.g., an audio conference) have a line of sight of the audio source device. The audio source device may be used to play out (e.g., produce, generate, etc.) signals $s_j(n)$, which may be identical signals played, each played out with a unique onset time $\tau_j$. The total output signal of the audio source device may be a sum of the individual signals $s_j(n)$; that is $s_j(n)=\Sigma_j s_j(n)$, where the sum is over all excitation signals played out. In at least the present example, it may be assumed that the signals $s_j(n)$ are separated in time by a fixed period of $T_p$ seconds (s). In this case $s_j(n)=s_0(n-j T_p)$. Such a fixed time separation makes the overall output signal s(n), which represents the sum of the signals $s_j(n)$ periodic during the calibration signal generation process.

It should be noted, however, that the assumption of the fixed time separation described above is not a requirement of the embodiments described herein. Instead, in accordance with one or more embodiments, the time interval between the emitted calibration signals $s_j(n)$ may not be fixed and/or the emitted signals may not necessarily be the same. In accordance with any such embodiments, however, the emitted signals should be known.

While the excitation signals are played out by the audio source device, as described above, the device may be moved in a waving motion (e.g., by an operator of the device) and the generated audio may be captured at each applicable microphone being used in a communication session. If the duration of each of the excitation signals $s_j(n)$ is short in comparison to the velocity of the moving audio source device, each signal may be treated as a distinct acoustic event $s_j(n)$ with onset time $\tau_j=\tau_0+jT_p$. By substituting $\tau_j$ with $\tau_0+jT_p$ in equation (2), above, it is realized that the source onset times may be corrected for by subtracting the known $jT_p$ from the observed RTOAs. Further, setting the onset time of the first acoustic event as the time origin, $\tau_0=0$, gives the following $$t_{ij}=c^{-1}\|r_i-s_j\|+\delta_i+v_{ij} \quad (3)$$

It should be noted that the above logic may still apply regardless of any internal delay at the transmit device (e.g., the audio source device).

A controlled signal such as that described above has several properties that improve the accuracy of microphone and source localization. For example, using such a signal eliminates the unknown acoustic source onset time, allows a large number of acoustic events to be generated in a short period of time, and the excitation signals $s_j(n)$ may be chosen to facilitate accurate RTOA measurements.

In accordance with at least one embodiment, the signal that may be used for $s_j(n)$ may be chosen based on the criteria that the measurement should be robust to additive noise and reverberation, and the signal should be of short duration (e.g., as compared to the velocity of the sound source). For example, the following three candidate signals may be considered as possibilities: (i) a unit impulse; (ii) a time-stretched pulse (TSP), which in some existing approaches is used for measurement of AIRs and has the desirable feature that the pulse can be much shorter than the length of the AIR; and (iii) a Gaussian modulated sinusoidal pulse (GMSP), which is understood by those skilled in the art as being a pulse that has the best trade-off between time and frequency localization according to a commonly utilized measure. One example advantage of the GMSP is that the pulse may be centered on a spectral region where the microphone characteristics can be assumed favorable. In accordance with at least one embodiment, the excitation signals $s_j(n)$ may be chosen as impulsive signals such that the RTOAs may be measured based on their peak values.

The received signals may be post-processed using a matched filter $h_{mf,j}(n)$, which is the time-reversed version of the excitation signal, $h_{mf,j}(n)=s_j(-n)$ and the RTOAs $t_{ij}$ may be extracted using a peak picking algorithm. For example, in accordance with at least one embodiment, the peak picking algorithm may include processing the input signal $x_{ij}(n)$ in non-overlapping frames of $T_p$ and the peak of each frame with the highest energy may be selected as candidate RTOAs. The J peaks with highest energy may then be selected from the identified candidates.

In the case of the TSP, the matched filter is equivalent to the inverse filter of the sequence and it results in an impulse (leaving the AIR). For the GMSP, and the unit impulse, it results in a peak at the maximum correlation between the two signals. In general, matched filtering also efficiently suppresses uncorrelated additive noise; the amount of noise suppression increases with sampling frequency and with filter length. Thus, it will not have an effect for the unit impulse.

Internal Delay Estimation

The RTOAs obtained in the manner described above may be considered accurate estimates of the TOFs up to an internal delay associated with each device. Because the problems associated with unknown source onset times have been resolved through the utilization of a controlled audio source, as described above, only the internal delays of the devices need to be estimated (the first onset time of the generating may be arbitrarily selected as zero). This leads to a simplified algorithm as described in greater detail below.

Without loss of generality, it may be assumed that c=1 and that the RTOAs have been extracted correctly (up to an internal delay) such that $\epsilon_{ij}=0$. Squaring both sides of equation (3), subtracting the equation for i=1, and then subtracting the equation for j=1 gives the following:

$$-(r_i-r_1)^T(s_j-s_1)=0.5(t_{ij}^2-t_{1j}^2-t_{i1}^2+t_{11}^2)-\delta_i(t_{ij}-t^{j1})+\delta_i(t_{1j}-t_{11}), \quad (4)$$

i=2, ..., I, j=2, ..., J. Equation (4) may further be expressed as $$-\bar{R}\,\bar{S}^T=T+A(\delta), \quad (5)$$

where $\bar{R}$ is the (I−1)×3 location matrix of the microphones relative to $r_1$, $\bar{S}$ is the (J−1)×3 location matrix of the acoustic events relative to $s_1$, $T_{i-1,j-1}=0.5(t_{ij}^2-t_{1j}^2-t_{i1}^2+t_{11}^2)$, vec$\{A(\delta)\}=W\delta$, $\delta=[\delta_1 \delta_2 \dots \delta_I]^T$, and W is a matrix composed of terms $(t_{ij}-t_{i1})$ and $(t_{1j}-t_{11})$. It should be noted that vec$\{X\}$ defines an operator that stacks the columns of a matrix into a column vector.

From equation (5), above, it may be seen that matrix $\bar{R}\,\bar{S}^T$ is at most rank 3. As a result, a two-stage iterative algorithm may be used to estimate the internals delays δ such that $\hat{T}=T+A(\delta'')$ is of rank 3. In accordance with at least one embodiment, in the first stage the current estimate of δ, δ" may be used. Keeping this estimate fixed, the estimate of $\bar{r}$ $\bar{S}^T$ may be determined according to the following optimization problem.

$$\tilde{T}_3^{(n)} \times \arg\min_{T_3} \|\hat{T}^{(n)}-\tilde{T}_3\|_F \text{ s.t. rank}\{\tilde{T}_3\} \leq 3, \quad (6)$$

where $\hat{T}^{(n)}=T+A(\delta^{(n)})$; $\tilde{T}_3^{(n)}$ is the best (according to the Frobenius norm) rank-3 approximation of $\hat{T}^{(n)}$, and therefore, the best approximation of $\bar{R}\,\bar{S}^T$. The solution to equation (6) may be obtained using, for example, the Eckhart-Young-Mirsky low-rank approximation theorem. Consider, for example, the singular value decomposition (SVD) of $\hat{T}^{(n)}$, $\hat{T}^{(n)}=U\Sigma V^T$, which may be written as $$\hat{T}^{(n)} = [U_1 \ U_2] \begin{bmatrix} \Sigma_1 & 0 \\ 0 & \Sigma_2 \end{bmatrix} [V_1 \ V_2]^T, \quad (7)$$

where $\Sigma_1$ contains the three largest singular values and $U_1$ and $V_1$ are the corresponding left- and right-singular vectors. The optimal rank-3 approximation in terms of the Frobenius norm may be obtained as $$\tilde{T}_3^{(n)}=U_1\Sigma_1 V_1^T. \quad (8)$$

In the second stage, the estimate of the internal delays may be updated as $$\delta^{(n+1)} = \arg\min_\delta \|E^{(n)} - A(\delta)\|_F^2 + \lambda\|\hat{T}^{(n)}\|_F^2$$
$$= \frac{W^+ vec\{E^{(n)} - \lambda T\}}{1+\lambda} \quad (9)$$

where $E^{(n)}=\tilde{T}_3^{(n)}-T$ and $W^+$ is the pseudo-inverse of W. The additional {constraint on, term} $\|\hat{T}^{(n)}\|_F^2$ is introduced in order to force the solution to have reasonable delay values, which increases the initial convergence rate. However, λ should be set to zero when the solution has become reasonable according to some criterion to allow the algorithm to converge fully. In accordance with at least one embodiment, this may be done by monitoring $F_T^{(n)}=\|\hat{T}^{(n)}\|_F$ and setting λ=0 when the change from one iteration to the next is below a threshold. It should be noted that the precise value of this threshold only affects convergence rate, and a reasonable value for this threshold may be selected by noting that the Frobenius norm has unit time squared. As such, the threshold may be set to be small compared to the square of a typical time-of-flight. For example, in accordance with at least one embodiment, the threshold may be selected as 0.01 ms².

Similarly, $F_E^{(n)}=\|E^{(n)}-A(\delta)\|_F$ may be monitored and the algorithm may be stopped when the change from one iteration to the next is below a threshold value. Again, this threshold may be set to be a small value as compared to the square of the typical time-of-flight. For example, the threshold may be set sufficiently small such that its value may not affect the precision of the algorithm output. In accordance with at least one embodiment described herein, this threshold may also be selected as 0.01 ms².

In accordance with at least one embodiment, the algorithm may converge in terms of the Frobenius norm for λ=0. It should be noted that, unlike some existing approaches, the algorithm described above does not include any step that requires non-linear optimization. As such, the convergence of the two-step algorithm described herein is an improvement over other existing approaches.

Microphone Localization

Given accurate estimates of the internal delays of the microphones, as described above, the corrected matrix of relative TOAs, $\hat{T}$, may be used to estimate the locations of the sources and the microphones. First, $\hat{T}$ may be converted to a squared distance matrix as $D=c^2\hat{T}$, where c=343 m/s, and where equation (5) is written as $-\bar{R}\,\bar{S}^T=D$. Taking the SVD of D gives $D=U\Sigma V^T$, and since $\bar{R}\,\bar{S}^T$ is a matrix of rank 3, only the three largest singular values in Σ need to be considered similar to equation (7) above. The remaining values in Σ should be zero or close thereto. Therefore, the following applies:

$$\bar{R}=U'_1 C \quad (10)$$

$$-\bar{S}^T=C^{-1}\Sigma'_1 V'^T_1, \quad (11)$$

where C is an invertible 3×3 matrix (to be estimated). The minimum solution for the localization is invariant to rotations or translations of the source-microphone configuration. Therefore, the coordinates of the first microphone may be constrained to be the origin, $r_1=[0\ 0\ 0]^T$, and the coordinates of the first source to be on the x-axis, $s_1=[s_{x,1} 0\ 0]^T$. The matrix C and of $s_{x,1}$ can then be estimated using the non-linear least-squares (LS) optimization criterion, as follows:

$$\hat{C}=\arg\max_C \Sigma_{i=1}^{I-1}\Sigma_{j=1}^{J-1}\{([U'C]_{i1}^2-[U'C]_{i2}^2+[U'C]_{i3}^2)^2+[U\Sigma'V]_{ij}-2[U'C]_{i1}s_{x,1}-d_{i+1,j+1}^2+d_{1j+1}^2)^2\}, \quad (12)$$

where $d_{ij}=c(t_{ij}-\delta_i)$. The estimated source and the microphone positions may be determined by substituting $\hat{C}$ and $s_{x,1}$ into equation (10). Such an approach results in the estimation of only ten parameters, independent of the number of acoustic events and microphones. It is known that increasing the number of acoustic events or microphones increases the estimation accuracy. In accordance with at least one embodiment, all of the estimated parameters may be used as initialization for a final refinement of the estimates using the non-linear LS criterion based on equation (3):

$$\hat{R}, \hat{S} = \operatorname{argmin}_{R,S} \sum_{i=1}^{I} \sum_{j=1}^{J} \left[ \left( \frac{\|r_i - s_j\|}{c} + \delta_i \right) - t_{ij} \right]^2. \quad (13)$$

Microphone Gain Calculation

In accordance with one or more embodiments described herein, the estimated TOFs may be used together with the received calibration signals to determine the unknown gains $G_i$ at each microphone. A free-field AIR may be considered and it may be assumed that the noise and excitation signals are uncorrelated. From equation (1) the energy at the ith microphone due to the jth acoustic event, including the microphone gain, may be written as $$E_x^{ij} = \frac{G_i^2 E_s^j}{d_{ij}^2} + G_i^2 E_v^{ij}, \quad (14)$$

where $E_s^j$ is the energy of the signal at the acoustic source at the jth location, $E_v^{ij}$ is the energy of the measurement noise, and $d_{ij} = \|r_i - s_j\| = ct_{ij}$ is the distance between the jth acoustic source and the ith microphone. It should be noted that the TOF measurements or the estimated source-microphone locations may be used for the distance estimate.

Given the above, an arbitrary reference microphone may be selected, for example, the first I=1, which leads to the following expression for the microphone gains relative to the reference microphone $$\frac{E_x^{ij} d_{ij}^2}{E_x^{1j} d_{1j}^2} = \frac{G_i^2}{G_1^2} \left( \frac{1 + \zeta_{ij}^{-1}}{1 + \zeta_{1j}^{-1}} \right), \quad (15)$$

where $\zeta_{ij}$ is the signal-to-noise ratio (SNR) for the jth source at the ith microphone. From equation (16), presented below, it is understood that the observation noise will add a bias to the estimated relative gains for the microphones, and this bias will depend on the SNR at the observations. For spatially diffuse noise or for closely spaced microphones where the SNR can be expected to be the same across the microphones, noise will have little effect. However, for other scenarios, the bias may be corrected if the SNR at the microphones is estimated. Although reverberation is not explicitly considered, its effects may be minimized in practice by making the excitation intervals Tp greater than the reverberation time.

The relative microphone gains may be determined as $$\frac{G_i}{G_1} = \frac{1}{J} \sum_{j=1}^{J} \left( \frac{E_x^{ij} d_{ij}^2}{E_x^{1j} d_{1j}^2} \right)^{1/2}, \quad (16)$$

where the measured TOF and the a priori knowledge of the emitted calibration signal durations may be used to evaluate the signal energies. It should be noted that in accordance with the various embodiments described herein, the TOF estimation is independent of gain differences between the microphones.

Example Calculations

The following presents some additional examples to further illustrate the microphone array calibration method described herein. In one example provided below, the RTOA is evaluated using different calibration signals. In the second and third examples, the measured TOFs are used for microphone localization and gain calibration. Each of these example processes is described in greater detail below.

All of the following examples are based on the same initial conditions and setup. The setup begins by generating observed signals according to equation (1), described above. The acoustic environment may be simulated using a source-image method known to those skilled in the art. The illustrative example is for a room with the following example dimensions: 6 m (meters)×5 m×4 m. The reverberation time $T_{60}$ is varied between 0 s (e.g., free-field) and 0.6 s in steps of 0.15 s. I=8 microphones are positioned randomly within a rectangular space of 2 m×2 m×1 m in the center of the room and J=30 sources are randomly distributed in a one meter cubic (1 m³) space positioned at random in the room. Ten different source-microphone configurations are then generated. Each source-point is defined by the AIR $h_{ij}(n)$ and emulates an instantaneous location of the moving acoustic source. The calibration signal $s_j(n)$ used may be an impulse, a 1.3 ms TSP, or a 1 ms GMSP, with a display interval of $T_p$=0.1 s.

White Gaussian additive noise may be assumed for $v_{ij}(n)$. The noise level is adjusted with reference to the free-field unit impulse according to desired SNR and held constant for the other excitation signals. The examples consider SNRs between −25 dB and −5 dB (performance is found to be unaffected for SNRs above −5 dB). Furthermore, a random gain factor $G_i$ varying between 0.5 and 1, and a random internal delay between 0 and 1 s are applied to each microphone. The sampling rate is set to $f_s$=48 kHz.

Example 1

Figure 4:
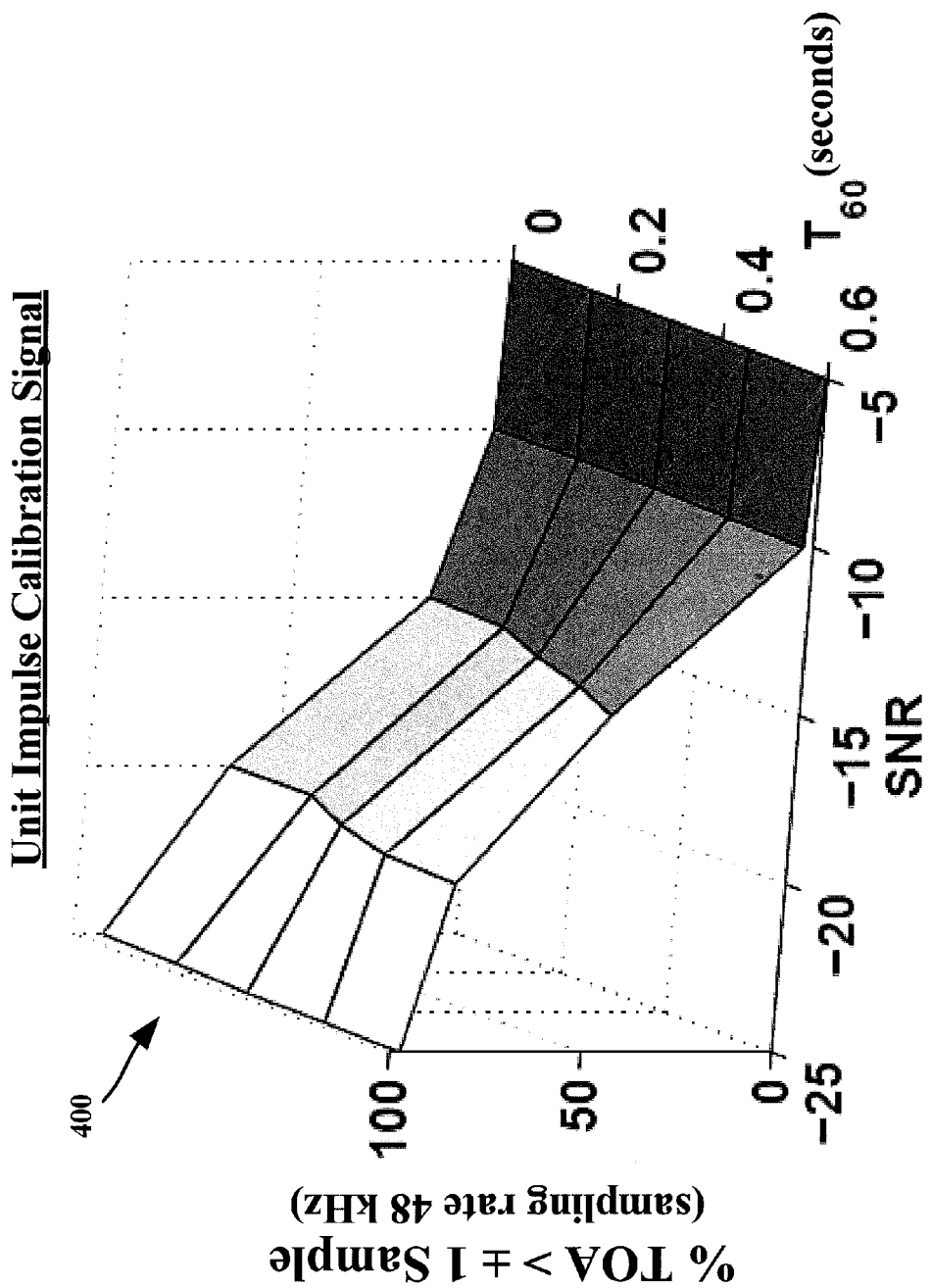
FIG. 4 is a graphical representation illustrating example estimation error results for extracting time-of-flight measurements of a plurality of unit impulse calibration signals at a set of sensors according to one or more embodiments described herein.
Figure 5:
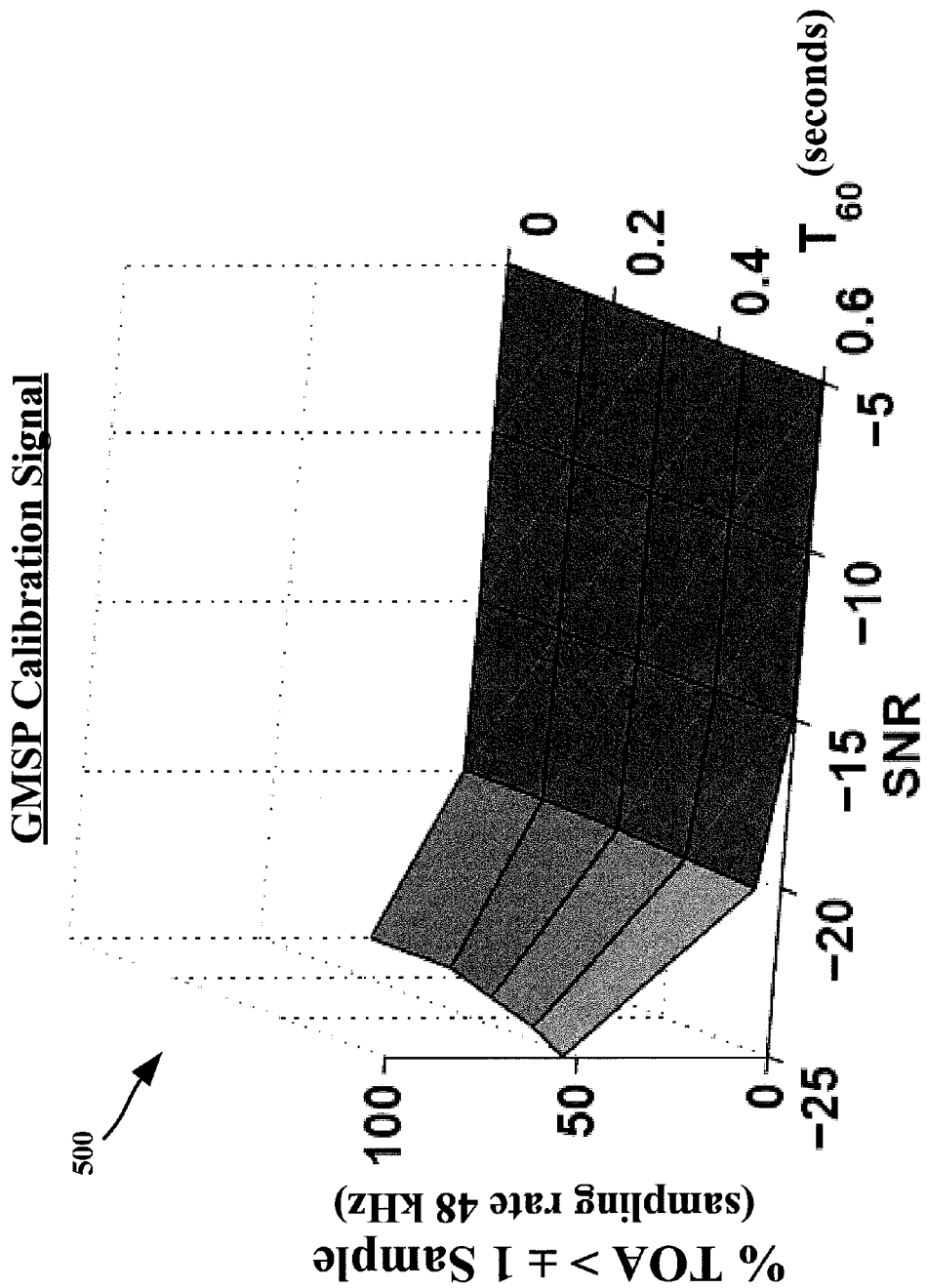
FIG. 5 is a graphical representation illustrating example estimation error results for extracting time-of-flight measurements of a plurality of Gaussian modulated sinusoidal pulse (GMSP) calibration signals at a set of sensors according to one or more embodiments described herein.
Figure 6:
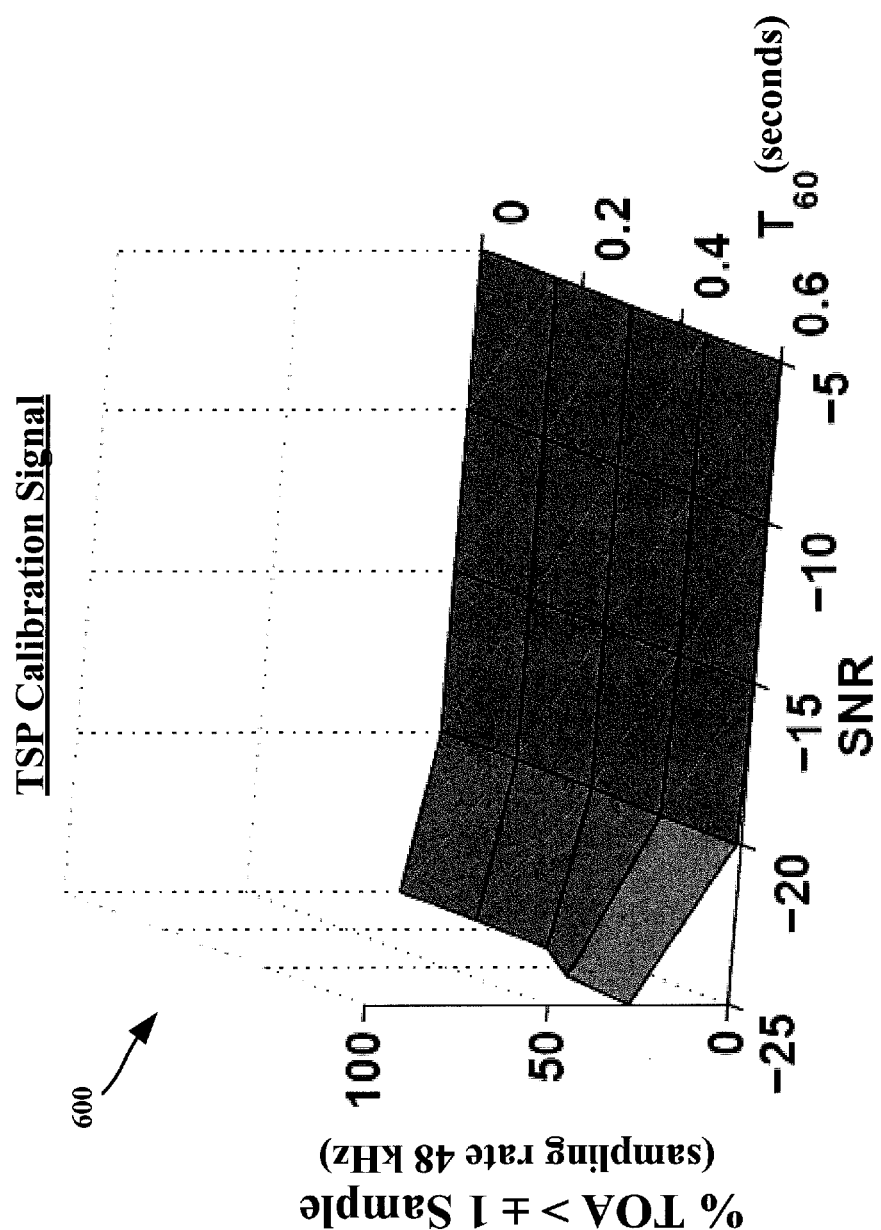
FIG. 6 is a graphical representation illustrating example estimation error results for extracting time-of-flight measurements of a plurality a time-stretched pulse (TSP) calibration signals at a set of sensors according to one or more embodiments described herein.

In a first example, different calibration signals may be evaluated for extracting the TOFs in accordance with the method described above (e.g., in Section 3.1.). In the present example, the internal delays are assumed known for the purpose of evaluation. For each case, the percentage of correctly identified TOFs within ±1 sample may be calculated. FIGS. 4-6 illustrate example results of performing this calculation for the different calibration signals, where the sampling rate used is 48 kHz. FIG. 4 is a graphical representation 400 showing example estimation error (in % correct TOFs to within ±1 sample) for the unit impulse as the calibration signal. FIG. 5 is a graphical representing 500 showing example estimation error using the GMSP as the calibration signal. In addition, FIG. 6 is a graphical representation 600 showing example estimation error using the TSP as the calibration signal. It can be seen from the example results shown in FIGS. 4-6 that the TSP has the greatest tolerance to noise and reverberation as compared with the other two calibrations signal types, and all TOFs are extracted accurately.

Example 2

Figure 7:
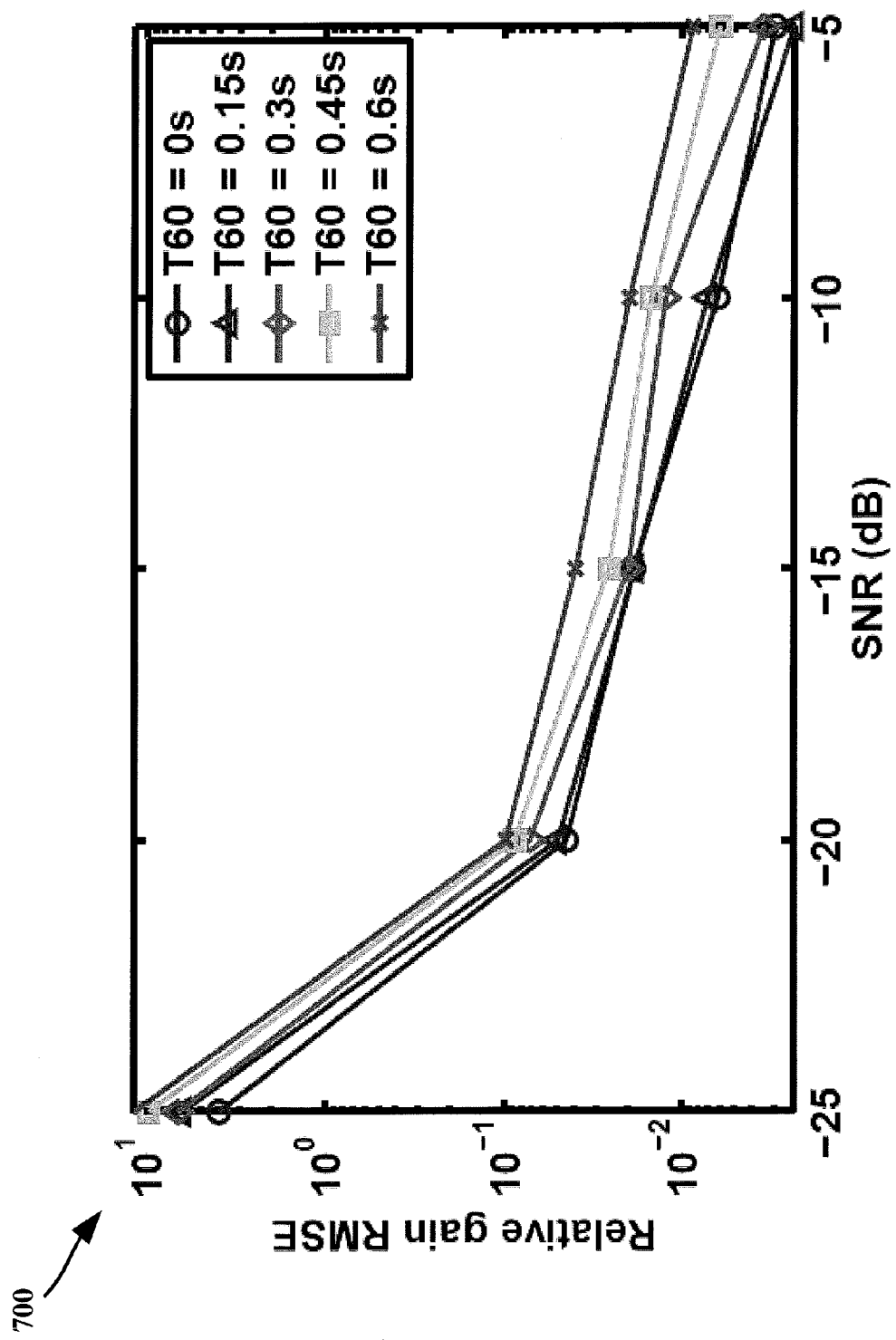
FIG. 7 is a graphical representation illustrating example results for determining relative gains for a set of sensors using estimated time-of-flight measurements according to one or more embodiments described herein.

In another example the estimated TOFs may be utilized to find the gains relative to microphone i=1 in accordance with the method described above (e.g., in "Microphone Gain Calibration"). FIG. 7 is a graphical representation 700 illustrating example results for different noise levels and different levels of reverberation.

Experiment 3

Figure 8:
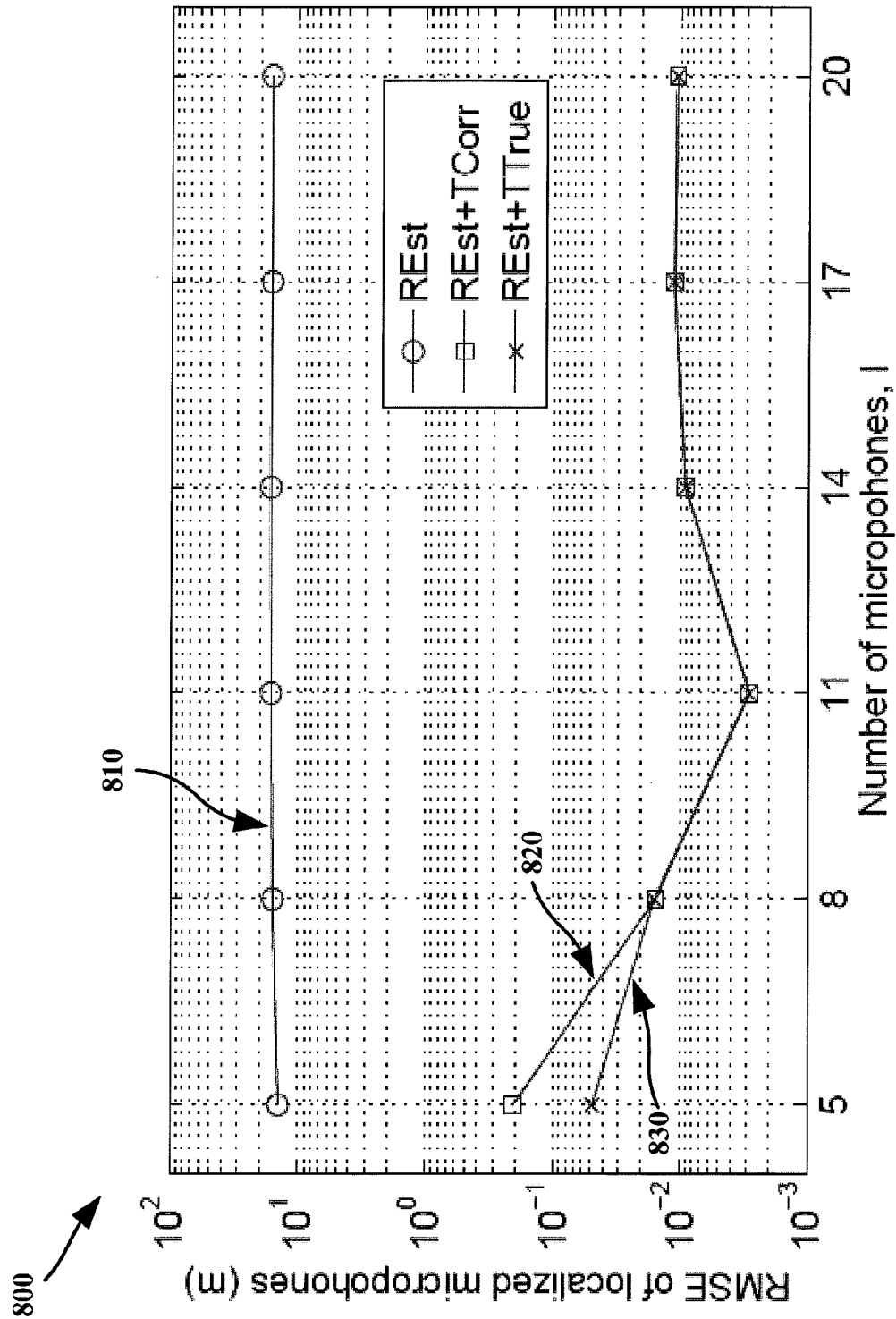
FIG. 8 is a graphical representation illustrating example results for determining locations of a set of sensors based on time-of-arrival measurements of a plurality of calibration signals at the set of sensors according to one or more embodiments described herein.

In yet another example, the updated TOFs may be used to find the locations of the microphones and the sources in accordance with the method described above (e.g., in "Microphone Localization"). FIG. 8 is a graphical representation 800 illustrating example results using exactly known internal delays 830, estimated internal delays 820, and no consideration of the internal delays 810.

Experiment 4

Figure 9:
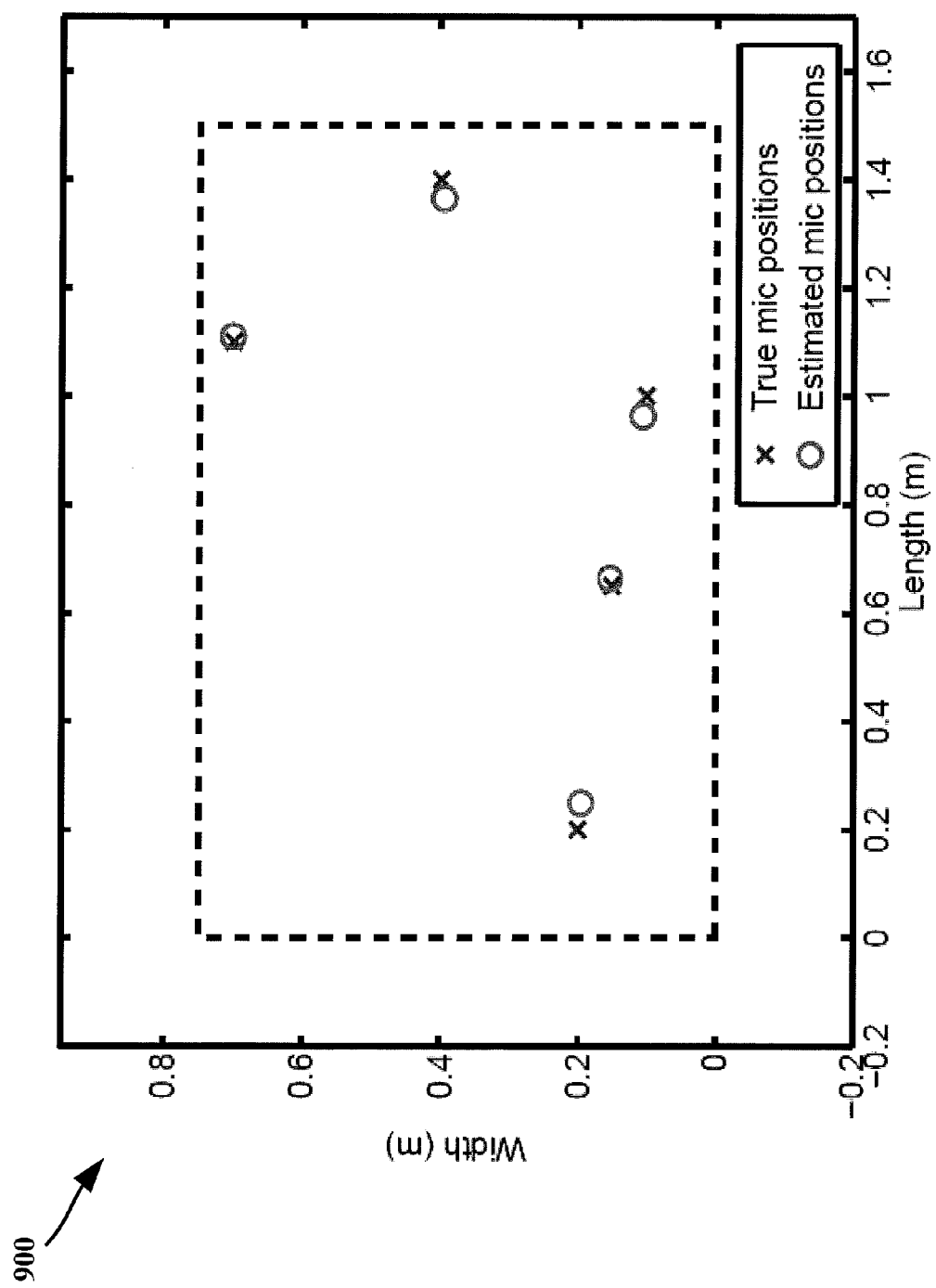
FIG. 9 is a graphical representation illustrating example results for determining locations of a set of sensors of a particular type and in a particular environment based on time-of-arrival measurements of a plurality of calibration signals at the set of sensors according to one or more embodiments described herein.

In still another example, all of the processes described in the previous examples may be performed using five AKG C417 lapel microphones connected to an RME Fireface 800 through an RME Octamic II microphone preamplifier. In such an example, the microphones may be positioned randomly on a table with dimensions of 0.75 m×1.5 m in a quiet, mildly reverberant room. A mobile telephone may be used as a sound source and a pulse train with 50 pulses at $T_p=0.1$ s intervals may be produced by the telephone while it is being moved in a waving motion (e.g., by a user). An additional random delay between 0 and 100 ms may be added to each microphone signal to simulate different internal delays. FIG. 9 is a graphical representation 900 illustrating example results of the microphone localization. The microphones may be localized to an accuracy of 2.9 cm, while using the centralized clock only resulted in an root mean squared error (RMSE) of 1.4 cm.

Figure 10:
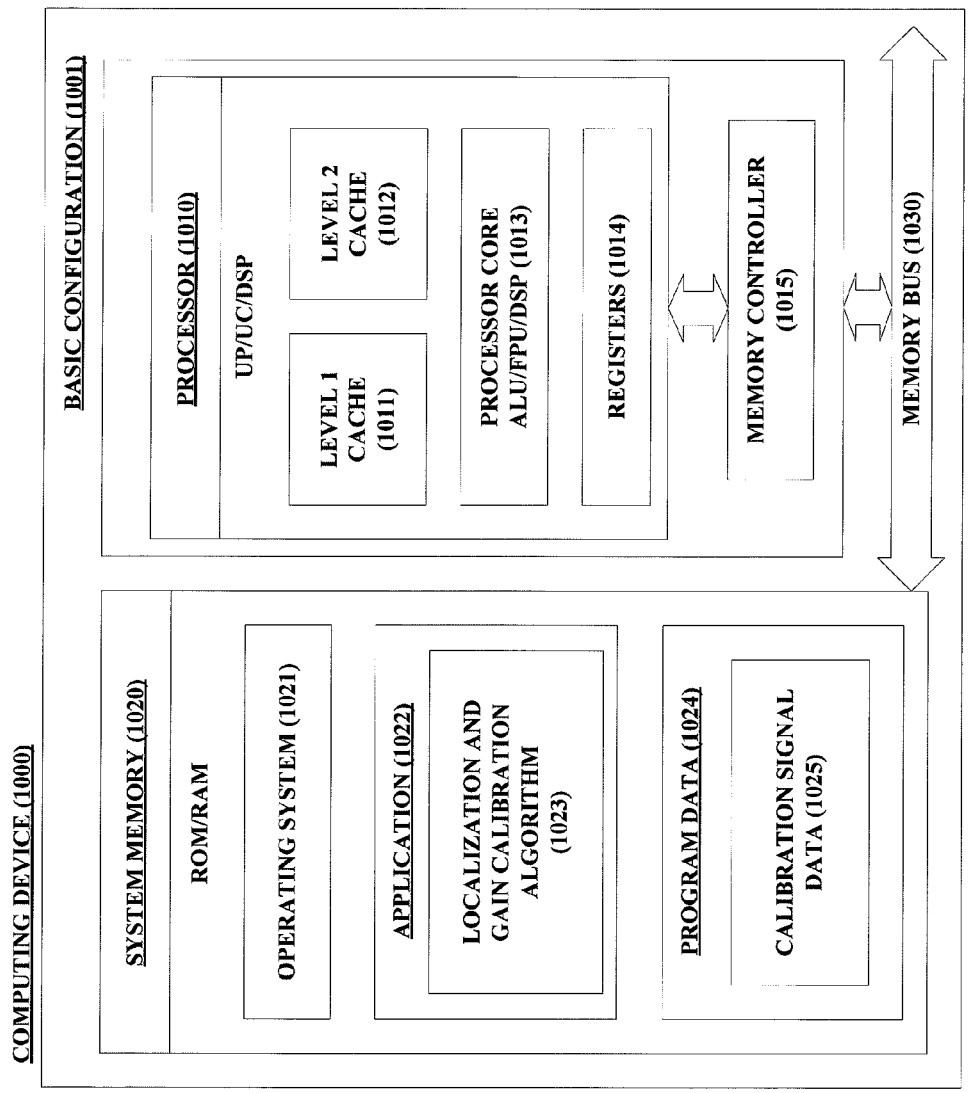
FIG. 10 is a block diagram illustrating an example computing device arranged for calibrating a distributed sensor array using time-of-arrival measurements according to one or more embodiments described herein.

FIG. 10 is a high-level block diagram of an exemplary computer (1000) arranged for calibrating a distributed sensor (e.g., microphone) array using TOF measurements for a plurality of spatially distributed acoustic events at the sensors according to one or more embodiments described herein. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (µP), a microcontroller (µC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include localization and gain calibration algorithm (1023) for calibrating a plurality of sensors using TOF measurements for a plurality of spatially distributed acoustic events at the sensors according to one or more embodiments described herein. Program Data (1024) may include storing instructions that, when executed by the one or more processing devices, implement a method for calibrating a distributed sensor (e.g., microphone) array using TOF measurements for a plurality of spatially distributed acoustic events at the sensors according to one or more embodiments described herein.

Additionally, in accordance with at least one embodiment, program data (1024) may include calibration signal data (1025), which may include data about the properties and/or characteristics of a particular signal type used as an excitation signal emitted from an audio source device to improve the accuracy of microphone and source localization (e.g., excitation signals $s_j(n)$, as described above in the section "Excitation Signals"). For example, calibration signal data (1025) may include various properties data about any of the following example signal types that may be selected to facilitate accurate RTOA measurements: (i) a unit impulse; (ii) a time-stretched pulse (TSP); and (iii) a Gaussian modulated sinusoidal pulse (GMSP). In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    determining registered arrival times of a set of acoustic events at a set of sensors, wherein the acoustic events are generated at time intervals known to the sensors;
    calculating times of flight for the acoustic events to reach the sensors based on the registered arrival times of the acoustic events at the sensors, event generation times for the acoustic events, and estimated internal delays of the sensors; and
    using the calculated times of flight to determine locations of the sensors.

2. The method of claim 1, wherein, for each sensor, the time of flight for the acoustic event to reach the sensor is calculated by subtracting, from the registered arrival time for the sensor, the internal delay of the sensor and the event generation time for the acoustic event.

3. The method of claim 1, wherein calculating the times of flight for the acoustic events to reach the sensors is performed iteratively to refine the times of flight.

4. The method of claim 1, further comprising selecting the first acoustic event generated as a reference time for calculating the times of flight for the acoustic events to reach the sensors.

5. The method of claim 1, further comprising determining a relative gain for each of the sensors using the calculated location of the sensor and the registered arrival times of the events at the sensor.

6. The method of claim 1, wherein each of the acoustic events is a calibration signal that is a Gaussian modulated sinusoidal pulse.

7. The method of claim 1, wherein each of the acoustic events is a calibration signal that is a time-stretched pulse.

8. The method of claim 1, wherein each of the acoustic events is a calibration signal that is a unit impulse.

9. The method of claim 1, wherein the set of sensors is a set of microphones.

10. The method of claim 1, wherein the set of events is generated by a device with a loudspeaker from a plurality of different locations relative to the sensors.

11. The method of claim 1, wherein one or more of the sensors are microphones located on mobile telephones.

12. A computer-implemented method comprising:
    calculating times of flight for a set of acoustic events to reach a set of sensors based on registered arrival times of the acoustic events at the sensors, event generation times for the acoustic events, and estimated internal delays of the sensors, wherein the acoustic events are generated at time intervals known to the sensors;
    calculating locations of the sensors using the times of flight for the acoustic events to reach the sensors; and
    determining a relative gain for each of the sensors using the calculated location of the sensor and the registered arrival times of the events at the sensor.

13. The method of claim 12, further comprising:
    measuring arrival times of the set of acoustic events at the set of sensors; and
    estimating internal delays of the sensors based on the registered arrival times of the acoustic events at the sensors.

14. The method of claim 12, wherein calculating the times of flight for the acoustic events to reach the sensors is performed iteratively to refine the times of flight.

15. The method of claim 12, further comprising selecting the first acoustic event generated as a reference time for calculating the times of flight for the acoustic events to reach the sensors.

16. The method of claim 12, wherein the relative gain for each of the sensors is determined based on an estimation of the signal-to-noise (SNR) at the sensor.

17. The method of claim 12, wherein each of the acoustic events is a calibration signal that is a Gaussian modulated sinusoidal pulse.

18. The method of claim 12, wherein each of the acoustic events is a calibration signal that is a time-stretched pulse.

19. The method of claim 12, wherein each of the acoustic events is a calibration signal that is a unit impulse.

20. The method of claim 1, wherein the set of sensors is a set of microphones and the set of events is generated by a device with a loudspeaker from a plurality of different locations relative to the microphones.

* * * * *